L. BEMELMANS.
Process and Apparatus for Separating Common Salt from its Solution.
No. 213,381. Patented Mar. 18, 1879.
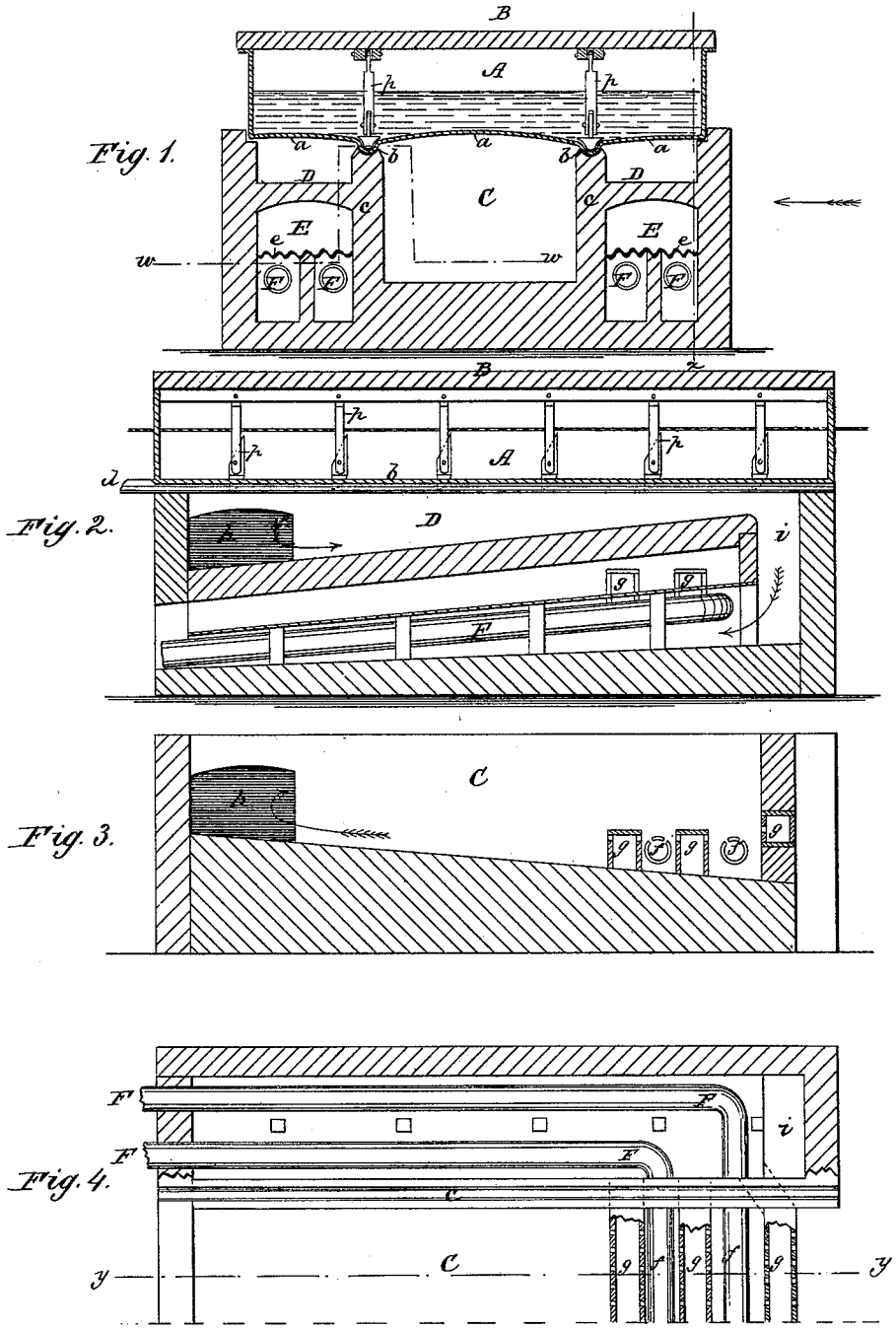
WITNESSES:
W. W. Hollingsworth
Edw. W. Byrn
INVENTOR:
L. Bemelmans
BY 
ATTORNEYS.

UNITED STATES PATENT OFFICE.

LEON BEMELMANS, OF KANAWHA COURT-HOUSE, WEST VIRGINIA.

IMPROVEMENT IN PROCESSES AND APPARATUS FOR SEPARATING COMMON SALT FROM ITS SOLUTION.

Specification forming part of Letters Patent No. 213,381, dated March 18, 1879; application filed November 30, 1878.

*To all whom it may concern:*

Be it known that I, LEON BEMELMANS, of Kanawha Court-House, in the county of Kanawha and State of West Virginia, have invented a new and Improved Process and Apparatus for Separating Common Salt from its Solution; and I do hereby declare that the following is a full, clear, and exact description of the same, reference being had to the accompanying drawings, forming part of this specification, in which—

Figure 1 is a vertical transverse section. Fig. 2 is a vertical longitudinal section through line $x\ x$ of Fig. 1, looking in the direction of the arrow. Fig. 3 is a vertical longitudinal section through line $y\ y$ of Fig. 4. Fig. 4 is a partial horizontal section through line $w\ w$ of Fig. 1.

My invention relates to a process and apparatus for recovering salt in a pure form from any of its solutions, but more particularly from the brine of salt springs abounding in West Virginia and other places.

The process consists in admitting continuously the salt brine into a body of bittern, and driving off by continuous evaporation the superfluous water as fast as it is admitted, whereby the salt is rendered incompatible with the permanent solution, and is thrown down out of solution in the form of pure white crystals of small size and uniform fineness, producing a merchantable article of a very superior order.

In carrying out my invention a quantity of bittern, the larger the better, is kept in a concentrating apparatus, and the brine is introduced in a continuous manner and agitated in the bittern, which causes the salt to precipitate in fine uniform and glistening crystals, while the evaporation, also in a continuous manner, brings back the bittern, or rather maintains it at the proper degree of concentration. The quantity of brine to introduce into the bittern depends on the evaporating capacity of the apparatus. It is such, however, that the bittern will remain approximately at a constant degree of concentration. The degree of concentration at which it is proper to keep the bittern varies with the quality or composition of the bittern. In general, it is the degree of concentration at which it holds no more salt. It varies with the composition of the bittern from 30° to 38° Baumé; but more or less concentrated bittern produces results approximating more or less those obtained by using bittern concentrated to the point aforesaid.

Referring to the drawings, which show an apparatus specially adapted to the carrying out of my process, A represents an evaporating-pan, having a removable cover, B. This pan is located above a gas-furnace adapted to heat the pan and effect the evaporation from the combustion of carbonic-oxide gas taken from a coke-oven, gas being preferred as a fuel in order to secure cleanliness and keep impurities from the salt. The bottom of the pan is made of metal, and has alternate arches $a$ and gutters $b$. This form of bottom to the pan, in connection with the agitation due to ebullition, causes the deposited salt to settle in the troughs to the exclusion of other places, the tendency of the salt to settle at such places being assisted by locating such troughs directly over the partition-walls $c\ c$, so that there shall be no direct heat of the flames at these points, and no disturbance of the deposits from ebullition. For conveying the deposits in these troughs to the outlet at the end, a series of swinging arms, $p$, are pivoted to the cover of the tank, and linked together in line, so as to be reciprocated by power transmitted from an external source. These arms each carry a loosely-pivoted shovel that plays in the trough, which shovels, as the arms reciprocate, transfer the deposits from one to the other, and finally deliver it at the outlet $d$ to a rotary pump, (not shown,) together with more or less of the bittern, to be washed clean and dried. This arrangement of devices both conveys the deposits and effects the agitation of the liquid.

The furnace beneath the pan has five main compartments or flues, C D D and E E. The compartments E E are arranged one upon each side of the furnace, and are separated by a horizontal partition, $e$, into two flues, made corrugated for greater surface. In the lower flue the gas is introduced through the two pipes F F, and emerges through the slits $f\ f$ at the lower end of the central flue, C. (See Figs. 3 and 4.)

In the flue, above the partition e, the air is admitted, and thence emerges through the perforated boxes g g at the lower end of the middle flue, C. The air and gas here unite to produce the flame, which moves up the incline of the chamber C to its highest end, where it passes laterally both ways into the side flues, D D, through the open spaces h. (See Fig. 3.) It then passes up the flues D D, Fig. 2, is deflected down through the end spaces, i i, and passes around the exterior of the gas-pipes, and, after traversing the space about the gas-pipes, emerges from beneath the partition e at the point where the gas enters. As the flame and smoke leave the furnace, the air and gas being introduced are heated thereby, and this intensifies the combustion of the same, when they become mingled and ignited.

The apparatus discharges continuously the salt deposited in the troughs through the outlets d, and the vapors of the evaporated water are drawn off through suitable outlets in the cover of the pan, at a reduced barometric pressure, by means of an air-exhauster at the end of a surface-condenser, (not shown,) while an inlet-pipe to the pan admits the supply of brine.

In carrying out my process, I would have it understood that I do not limit myself to the apparatus herein described, but may use any form of pan, heated from below, or basins, ponds, &c., heated by steam-pipes immersed in them; or I may use any other form of evaporating apparatus.

It is to be observed, however, that when the bittern holds chloride of magnesium, or any other compound easily decomposable by heat, it is proper to concentrate the bittern with caution, either at a low heat or by ebullition under an artificially-reduced barometric pressure.

Instead of employing the natural bittern, an artificial bittern may be used, consisting of a concentrated solution of deliquescent chloride, such as chloride of calcium or chloride of magnesium, &c., to start the process.

The product of pure salt obtained by my process is of fine uniform crystals, free from the pulverulent matter which characterizes salt made in the usual way, (by evaporating into large crystals and grinding,) and is better adapted to table use.

In defining my process with greater clearness, I would state that I am aware of the fact that salt has been thrown down out of solution in the evaporating-pan, and the solution containing the impurities flowed off at the top, which latter method was based upon the observance of the fact that the impurities in salt-water are held longer in solution and require a greater degree of heat to separate them than the salt does.

The facts upon which my process is founded are somewhat analogous—i. e., salt is insoluble in a liquid holding enough deliquescent chloride to indicate 35° Baumé when hot, or 39° when cold.

In carrying out my process, however, I prepare a liquid such that when a certain quantity of brine is added to it it will be a solution of deliquescent chloride at 35°. What salt then exists in the brine, being incompatible with such a liquid, separates instantly. After that, if I concentrate anew my solution of chloride to get rid of the superfluous water and add a new quantity of brine, I precipitate a new quantity of salt, and when, as in my process, the evaporation and addition of brine are so regulated that the solution of deliquescent chlorides remains at a strength of 35° Baumé when hot, and 39° when cold, the operation is a continuous one, and there is never any salt in solution in the mixture.

Having thus described my invention, what I claim is—

1. The process of separating salt from its brine solution, which consists in admitting continuously the said brine into a body of bittern or other concentrated solution of deliquescent chlorides, and driving off by continuous evaporation the superfluous water as fast as it is admitted, whereby the pure salt is entirely precipitated in the form of fine crystals of uniform size, substantially as described.

2. The evaporating-pan having its bottom wrought into alternate arches and gutters, in combination with hinged and pendent shovels, connected and arranged to move together in said gutters, substantially as described.

3. The combination, with the evaporating-pan A, of the furnace having compartments C D D E E, communicating, as described, the pipes F F, arranged in compartments or flues E, and having openings f, discharging into the central compartment, together with the partitions e and air-boxes g, substantially as described.

LEON BEMELMANS.

Witnesses:
JAMES E. MIDDLETON,
RICHARD HARTE.